May 14, 1929. B. W. KING 1,713,286
LEVER SYSTEM FOR SCALES OR THE LIKE
Filed Aug. 7, 1926 5 Sheets-Sheet 1

INVENTOR.
Bert W. King
BY
Stuart C. Barnes
ATTORNEY.

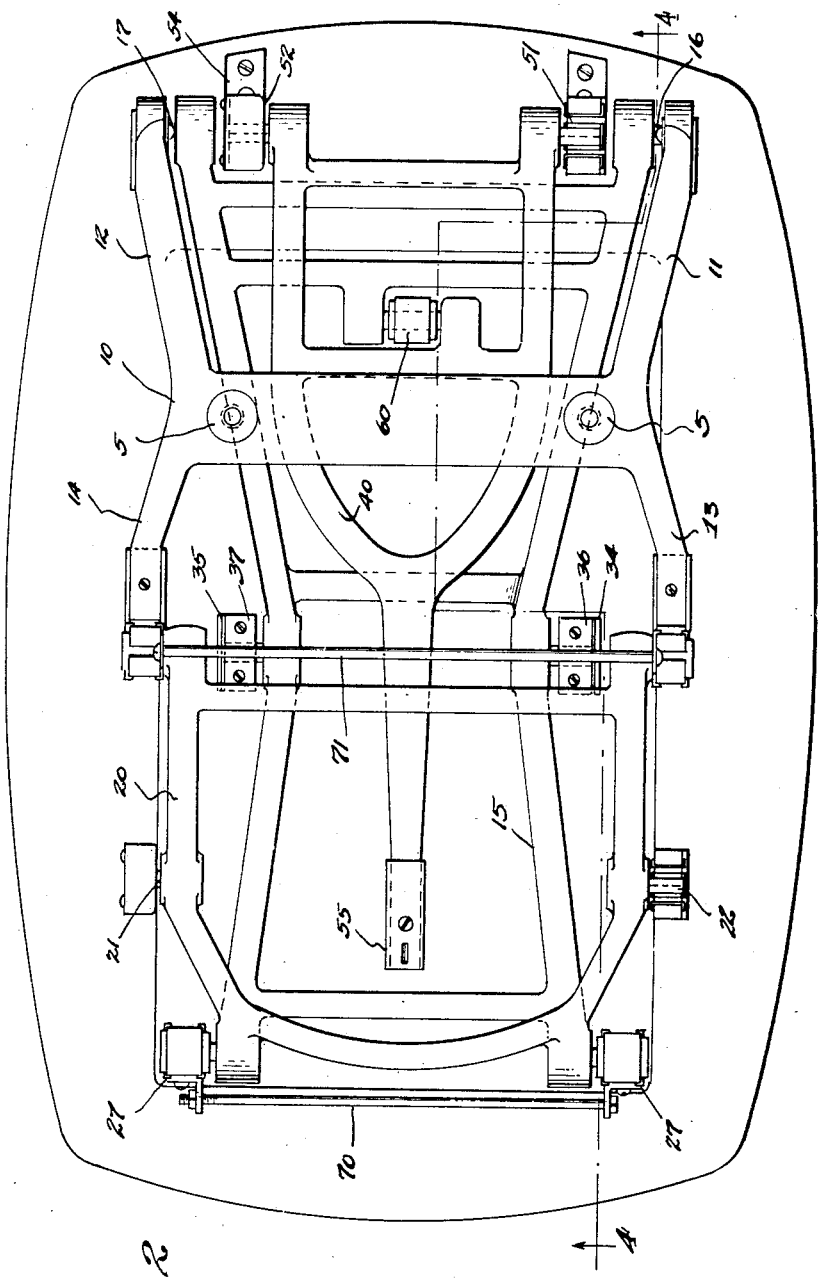

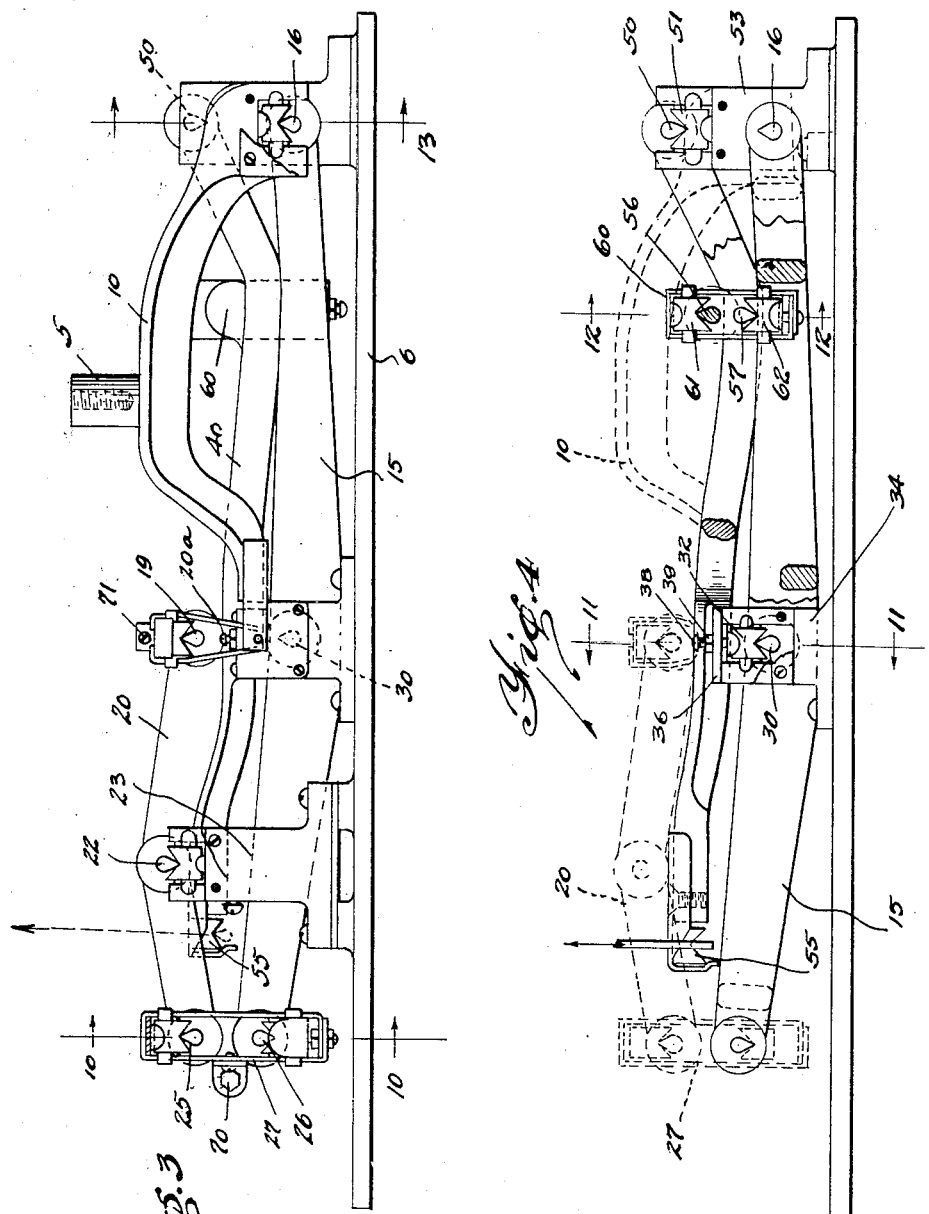

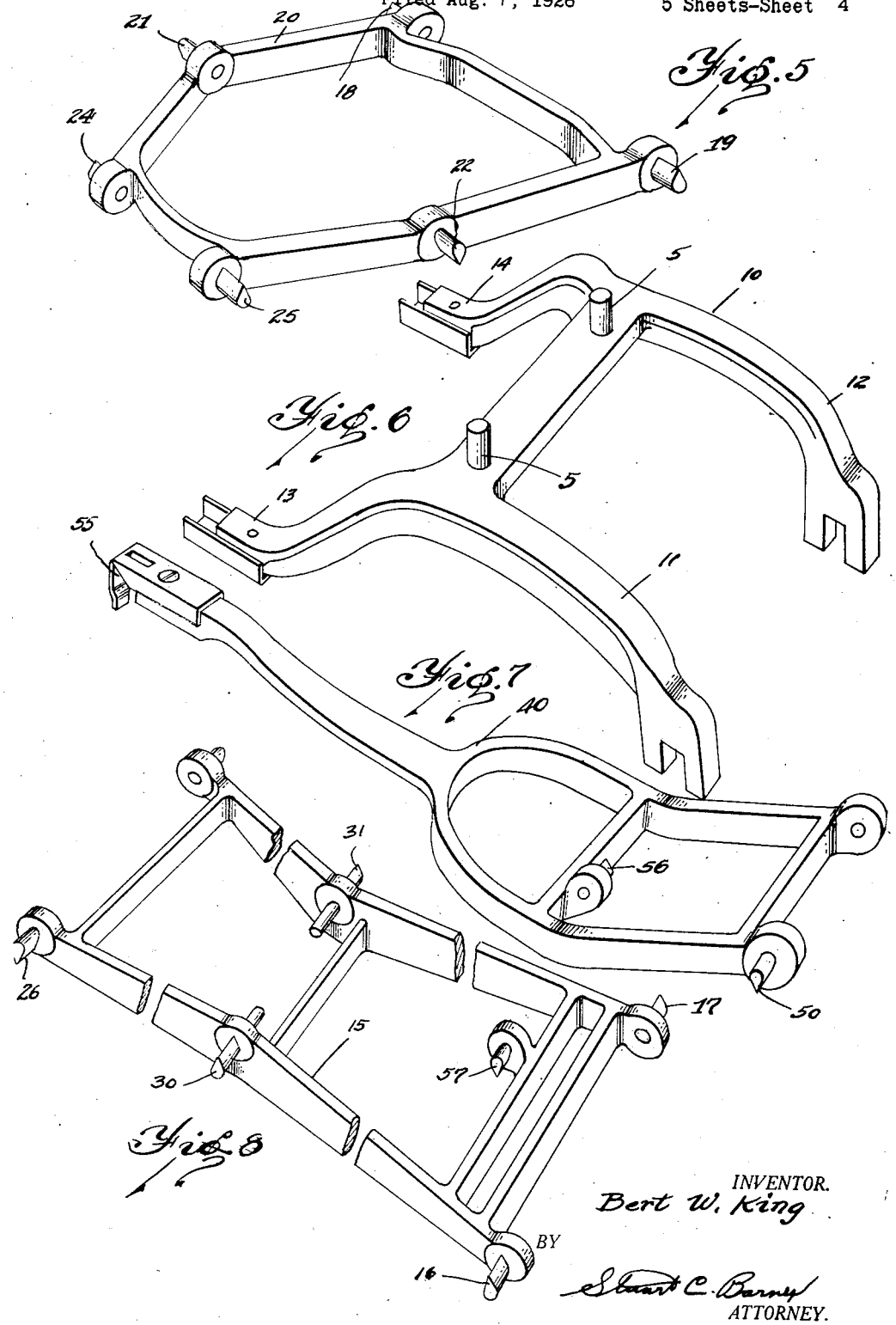

May 14, 1929.    B. W. KING    1,713,286
LEVER SYSTEM FOR SCALES OR THE LIKE
Filed Aug. 7, 1926    5 Sheets-Sheet 5
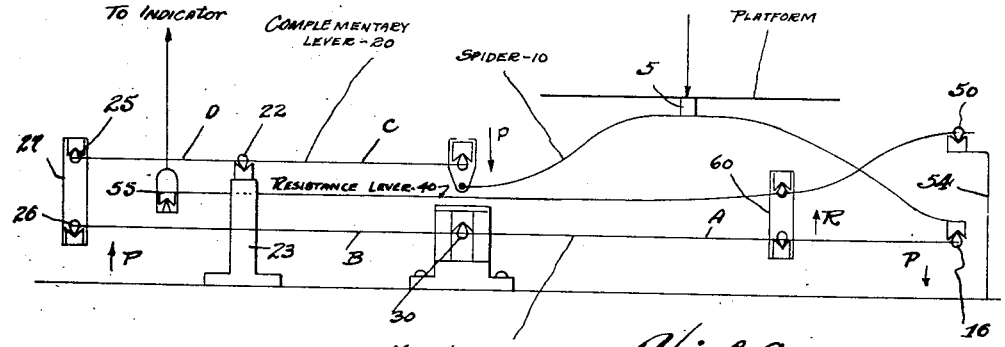
Fig. 9
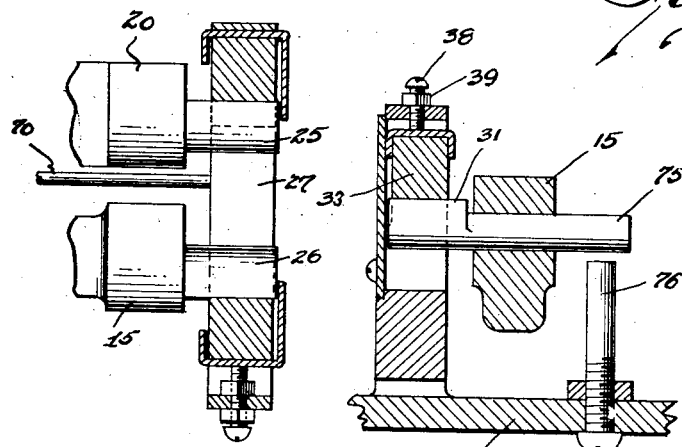
Fig. 10
Fig. 11
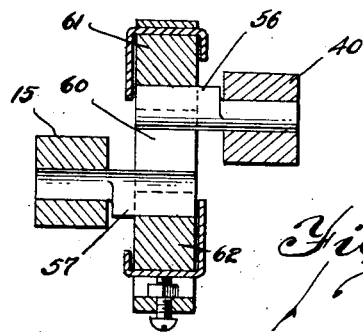
Fig. 12
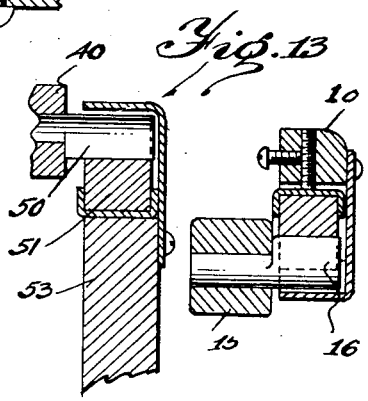
Fig. 13
INVENTOR.
Bert W. King
BY
Stuart C. Barnes
ATTORNEY.

Patented May 14, 1929.

1,713,286

UNITED STATES PATENT OFFICE.

BERT W. KING, OF DETROIT, MICHIGAN, ASSIGNOR TO BARNES SCALE COMPANY, OF DETROIT, MICHIGAN, A CORPORATION OF MICHIGAN.

LEVER SYSTEM FOR SCALES OR THE LIKE.

Application filed August 7, 1926. Serial No. 127,729.

This invention relates to weighing scales, and has to do particularly with a system of levers for scales, and it is an object of this invention to provide an improved lever system which is capable of use with scales of different types, such as a spring scale, a pendulum scale, or a gravity scale.

The levers are so arranged as to provide a four point support for the platform, a check link is done away with, a lower base for the scales is afforded, and the arrangement is such that it weighs the same no matter where the load is placed on the platform.

This system of levers includes a main lever, and a complementary lever which carry the load, and the arrangement is such that the entire load is communicated to the main lever. An additional lever, which is a resistance lever, is joined to the main lever, and one end of this lever may be connected to a suitable indicator.

The lever system is peculiar, and advantageous, in that only a slight pressure occurs at certain of the bearings, thus insuring a particularly smooth action and long life of the bearings. The two levers which carry the load are so co-related and proportioned that the load platform is at all times maintained in a horizontal position.

The invention will be more clearly understood by reference to the accompanying drawings wherein:

Fig. 2 is a plan view of the lever system.

Fig. 3 is a side elevation of the lever system with some of the cover plates for the knife edge and agate bearings removed.

Fig. 4 is a sectional view taken on line 4—4 of Fig. 2, showing some of the members in dotted lines.

Figure 1:
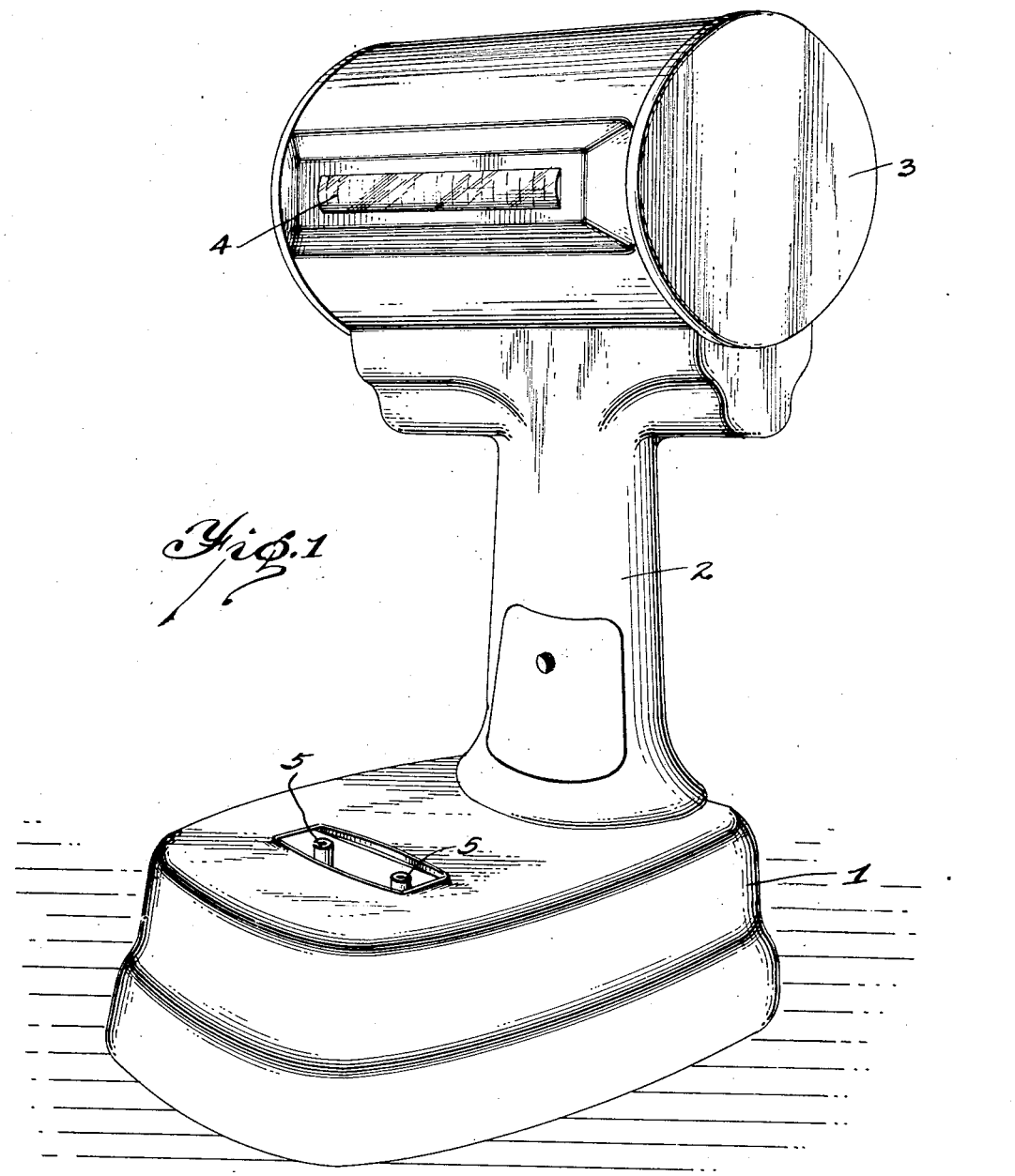
Fig. 1 is a perspective view of a spring or pendulum counter scale, with which the lever system may be used.

Figs. 5, 6, 7, and 8 are perspective views of the complementary lever, the platform spider, the resistance lever, and the main lever respectively.

Fig. 9 is a diagrammatic view of the lever arrangement showing how the load is communicated to the main lever through the complementary lever, and also showing the resistance lever which is connected to the main lever.

Fig. 10 is an enlarged sectional view taken on line 10—10 of Fig. 3, showing the manner in which the main lever is connected to the complementary lever.

Fig. 11 is an enlarged sectional view on line 11—11 of Fig. 4, showing the inverted fulcrum of the main lever, and the stop for preventing disengagement of the fulcrum bearings.

Fig. 12 is an enlarged section taken on line 12—12 of Fig. 4, showing the connection between the main lever and the resistance lever.

Fig. 13 is an enlarged section on line 13—13 of Fig. 3 showing the stationary fulcrum of the resistance lever, and also showing the knife edge and agate bearing which connects the platform spider with one end of the main lever.

The lever system of this invention can be used with a scale, as shown in Fig. 1. This scale includes a base 1, within which the levers are housed, a pedestal 2, and a drum 3 which houses an indicator 4. The levers in the base are connected to the indicator, as will readily be understood, and the base is provided with an opening so that a load platform may be connected to the lever system by means of the members 5.

In Figs. 5 to 8 inclusive, the several levers, and the platform spider are shown. A spider 10 has two legs 11 and 12, which are connected to a main lever 15 at points 16 and 17 (Fig. 3). The legs 11 and 12 are shaped so as to hold agate bearings for the knife edges at the points 16 and 17 on the main lever. The spider also has legs 13 and 14. These legs are suspended from points 18 and 19 of a complementary lever 20 by a link connection 20ª (Fig. 3). Thus, it will be seen that a load on the spider is carried by one end of the main lever 15 and by one end of the complementary lever 20.

The complementary lever 20 has knife edge bearings 21 and 22, which are fulcrumed on a stationary support 23. The stationary support is mounted upon a base plate 6. This is shown in Fig. 3, and also, diagrammatically shown, in Fig. 9. At one end, the complementary member has knife edges 24 and 25, and the main lever 15 has a pair of knife edges 26, and this main lever is suspended from the complementary member by a link connection 27 (Figs. 3 and 10).

Refer to Figs. 4, 8, and 9. The main lever is provided with knife edges 30 and 31. These knife edges fulcrum on inverted agate bearings 32 and 33, these agate bearings being disposed in uprights, 34 and 35 which are mounted upon the base plate. The uprights are bifurcated, as shown in Fig. 4, and the bearings are held in place by caps 36 and 37. Each agate bearing is adjustable by means of a set screw 38, which extends through the cap, there being a lock nut 39 for holding each bearing in position after it has been adjusted.

It will be observed that this fulcrum point of the main lever is inverted, in that the agate bearings are positioned above the knife edges, and the knife edges press upwardly against the bearings. When the parts are all connected and adjusted, there is a tendency, on the part of the main lever, to move upwardly, and thus the knife edges are urged toward the agate bearings. The knife edges contact with the bearings with a relatively light pressure which is perhaps due to the fact that the weight of the main lever must be overcome.

A resistance lever 40 (Fig. 7) has a pair of knife edges 50 which form the fulcrum point of this lever. These knife edges engage bearings 51 and 52 (Figs. 4 and 13) which are carried by supports 53 and 54. The opposite end of the resistance lever is provided with an agate bearing 55, and there is a connection at this end of the resistance lever which extends to a suitable indicator. When the levers are used in a scale, such as is shown in Fig. 1, this connection extends upwardly through the pedestal.

As shown in Figs. 7 and 8, the resistance lever 40 is provided with a knife edge 56, and the main lever is provided with a knife edge 57. These two levers are connected through these knife edges by means of a link connection 60, which includes agate bearings 61 and 62 (Figs. 4 and 12).

The link connections which suspend one end of the main levers from the complementary lever (Figs. 2 and 10), are connected by a rod 70, and are thus prevented from slipping off the knife edges. Likewise, the link connections which suspend the spider from the point 19 of the complementary lever are connected by a rod 71, so that they are prevented from slipping off their respective knife edges. As shown in Figs. 10 to 13 inclusive, which are details of several of the connections between the levers, the agate bearings are adjustably and removably mounted by means of set screws and lock nuts in a manner quite similar to the manner in which the agate bearings for the fulcrum of the main lever are mounted.

The normal tendency of the main lever is to move upwardly, so that the knife edges at the fulcrum point are urged toward the inverted agate bearings. For safety purposes, however, the main lever is provided with projections 75 (Fig. 11) which may be extensions of the same members which form the knife edges. Positioned immediately below these extensions 75 are stops 76. The extensions and the stops are, when the parts are in normal position, spaced from a slight distance from each other, and the stops prevent displacement of the bearing members in the case of any unusual condition. For instance, if the connection between the resistance lever and the indicator became broken, the main lever would drop downwardly. It would be stopped, however, by the stop members, and displacement of the several bearings would be prevented, because the amount of drop permitted is relatively slight.

The various lever arrangements, and connections having now been described with sufficient detail, further reference will be made to the diagrammatic showing in Fig. 9. A load on the platform, carried by the spider, rests directly at the point 16 of the main lever. The load also rests at the point 19 of the complementary lever and, due to the fact that the complementary lever is linked to the main lever by the link 27, the load, or power, exerts an upward force upon the main lever at this point. Thus, it will be observed that the power at one end of the lever is downward whereas, on the other end of the lever, it is upward, as indicated by arrows, P. Thus, the load on the platform tends to rotate the main lever about its fulcrum point 30 and, although the load is divided up and communicated to opposite ends of the main lever, the arrangement is such that both divisions of the load tend to move the lever about its fulcrum point in the same rotative direction.

The resistance offered by the lever 40 is applied to the main lever as at 60, and this resistance is upward, as indicated by the arrow R. These combined forces tend to lift the main lever bodily, the resistance overcoming the load on one end and lifting the lever, and the power serving to lift the opposite ends of the lever, namely, the left end as viewed in Fig. 9. Thus, the main lever is urged upwardly against its fulcrum point.

The lever 15, which has, for the purpose of convenience, been termed the main lever, is more than a simple lever, in that it combines more than one type of lever and is in the nature of a teeter. That part of the main lever which extends from the point of resistance to the left, forms a lever of the first order. The upward power is overcome by the resistance, and the fulcrum point is between the two. That part of the main lever from the fulcrum point 30 to the right, as viewed in Fig. 9, forms a lever of the second order, in that the fulcrum point and the power are at the ends with the resistance located between the two.

The main lever and the complementary lever which support the platform spider are proportioned so that the platform is maintained in a horizontal position. In other words, when a load is placed upon the platform, both levers are rocked upon their fulcrum points, and the points 19 and 16 (Fig. 9) move downwardly in the same degree. This is accomplished by making the lever arms A, B, C, and D proportionate, as follows: A : B : : C : D.

The design or general outline of a counter scale, such as shown in Fig. 1, is pretty well limited and defined, and the arrangement of the levers, as shown, fits nicely into the base of such a scale. However, if the levers are to be used with a different type of scale, or with a scale of different design or outline, the levers could be arranged so that the arms A and C are shorter than the arms B and D. They are greater, as shown in the drawings.

It will be understood, of course, that when a load is placed on the platform, the platform moves downwardly, and the two levers are rocked on the pivot points until such a time as the resistance offered through the resistance lever balances the load. This resistance may be supplied by a spring which may be positioned in the drum of the scale, or it may be provided by a pendulum. Again, the levers may be used with a gravity scale.

As shown in the drawings, the platform is supported to one side of a center line of the spider. The position of the platform with respect to the spider may be varied somewhat to fit the requirements of the more or less standard form of scales, although it is important that the platform be positioned so that the load communicated through the complementary lever is sufficient to raise the main lever against its fulcrum point.

I claim:

1. In a scale, a load receiving member, a lever for supporting one side of said member, and a single second lever for supporting the other side of said member, these two levers being connected together whereby the load is divided and communicated to opposite ends of the first mentioned lever.

2. In a scale, a load receiving member, a lever for supporting one side of said member, and a second lever extending in the same direction as the first mentioned lever for supporting the other side of said member, these two levers being connected together whereby the load is divided and communicated to opposite ends of the first mentioned lever, one division of the load exerting a downward force, and the other division of the load exerting an upward force on the said lever.

3. In a scale, a spider for supporting a platform, a main lever, and a complementary lever extending in the same direction as the first mentioned lever connected to the main lever, the spider being supported at one side by the main lever and at the other side by the complementary lever, the connections being such that the load on the platform is divided and communicated to opposite ends of the said main lever.

4. In a scale, a spider for supporting a platform, a main lever, a complementary lever connected to the main lever, the spider being supported at one side by the main lever, and at the other side by the complementary lever, the connections being such that the load on the platform is divided and communicated to opposite ends of the main lever, one division of the load exerting an upward force, and the other division of the load exerting a downward force, and a resistance lever connected to the said main lever.

5. In a scale, means for receiving a load, a lever having one end connected to one side of said means for supporting the same, a second lever for supporting the other side of said means, this second lever being positioned above the first and connected thereto at one end opposite that which supports the load receiving means, whereby the load exerts an upward force on this end and a downward force on the first mentioned end, and a resistance lever which exerts an upward force on the said first mentioned lever whereby this lever is lifted against an inverted pivot.

6. In a scale, a load receiving means, a lever, one end of which directly supports part of the load and the other end of which indirectly supports part of the load, a resistance means for overcoming the load, and an inverted pivot for said lever.

7. In a scale, a load receiving means, a lever, one end of which directly supports part of the load and the other end of which indirectly supports part of the load, a resistance means acting on the said lever, that part of the load which is indirectly carried by the lever exerting an upward force, and the resistance means exerting an upward force, and an inverted pivot for the said lever.

8. In a scale, a load receiving means, a lever, one end of which directly supports part of the load and the other end of which indirectly supports part of the load, a resistance means connected to the said lever, that part of the load which is indirectly carried by the lever exerting an upward force, and the resistance means exerting an upward force, and an inverted pivot for the said lever which is positioned between the two upward forces.

9. In a scale, a lever, a load receiving means, a direct connection between the load receiving means and one end of the lever, an indirect connection between the load receiving means and the other end of the lever, whereby the load exerts a downward force on one end of the lever and an upward force on the opposite end of the lever, and means exerting a resistance on the said lever within the points where the load is received.

10. In a scale, a lever, a load receiving means, a direct connection between the load receiving means and one end of the lever, an indirect connection between the load receiving means and the other end of the lever, whereby the load exerts a downward force on one end of the lever and an upward force on the opposite end of the lever, means exerting a resistance on the said lever, and an inverted pivot for the said lever.

11. In a scale, a lever, a load receiving means, a direct connection between the load receiving means and one end of the lever, an indirect connection between the load receiving means and the other end of the lever, whereby the load exerts a downward force on one end of the lever and an upward force on the opposite end of the lever, means exerting a resistance on the said lever whereby the said lever is bodily lifted, and an inverted pivot for the said lever.

12. A lever system comprising in combination, a lever of the first order, and a complementary lever of the first order extending in the same direction as the first lever, one end of one lever being connected to one end of the other lever, and the opposite ends of the levers being arranged to support a load.

13. A lever system comprising in combination, a load receiving means, a lever of the first order, and a complementary lever of the first order extending in the same direction as the first lever, one end of one lever being connected to one end of the other lever, the opposite ends of the levers being arranged to support the load receiving means.

14. A lever system comprising in combination, a load receiving means, a lever having an inverted pivot disposed between its two ends and having one of its ends arranged to partially support the load receiving means, and a second lever having a pivot disposed between its two ends, one end of the second mentioned lever being connected to one end of the first mentioned lever, and the other end being arranged to partially support the load receiving means.

In testimony whereof I affix my signature.

BERT W. KING.